(12) United States Patent
Masuda

(10) Patent No.: US 7,630,619 B2
(45) Date of Patent: Dec. 8, 2009

(54) IMAGE STABILIZATION APPARATUS AND OPTICAL APPARATUS

(75) Inventor: Shinchi Masuda, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 11/626,505

(22) Filed: Jan. 24, 2007

(65) Prior Publication Data

US 2007/0172220 A1 Jul. 26, 2007

(30) Foreign Application Priority Data

Jan. 26, 2006 (JP) ............... 2006-017845

(51) Int. Cl.
*G03B 17/00* (2006.01)
(52) U.S. Cl. .................... 396/55; 348/208.11
(58) Field of Classification Search ............ 348/208.11; 396/55
See application file for complete search history.

(56) References Cited

U.S. PATENT DOCUMENTS 4,996,545 A * 2/1991 Enomoto et al. ............... 396/53
5,717,960 A * 2/1998 Tomita et al. ................. 396/55
2001/0004420 A1* 6/2001 Kuwana et al. ............... 396/55
2002/0176713 A1* 11/2002 Kai et al. ..................... 396/429

FOREIGN PATENT DOCUMENTS

| JP | 02-066536 | 3/1990 |
| JP | 2002-207148 | 7/2002 |

* cited by examiner

*Primary Examiner*—Rodney E Fuller
*Assistant Examiner*—Fang-Chi Chang
(74) *Attorney, Agent, or Firm*—Canon U.S.A. Inc., I.P. Division

(57) ABSTRACT

An image stabilization apparatus is disclosed which can provide enhanced accuracy of image stabilization. The apparatus includes a movable member movable relative to a fixed member of the apparatus, plural flexible members which movably support the movable member at least in a direction orthogonal to the optical axis, a portion of each of the flexible members on one end side in a direction along the optical axis being fixed to the fixed member, a portion of each of the flexible members on the other end side being fixed to the movable member, and an actuator which drives the movable member. The flexural rigidity of at least one of the plural flexible members in the direction orthogonal to the optical axis is different from that of the other at least one flexible member in that direction so as to suppress rotation of the movable member driven by the actuator.

5 Claims, 21 Drawing Sheets

IMAGE STABILIZATION APPARATUS AND OPTICAL APPARATUS

BACKGROUND OF THE INVENTION

The present invention relates to an image stabilization apparatus which corrects image shake in an optical apparatus such as a camera.

Image stabilization apparatus is configured by, for example, of a shake detection system which includes a shake sensor and a shift mechanism which shifts a correction optical system or an image-pickup element in a direction orthogonal to the optical axis or the like in response to detected shakes.

In recent years, thin cameras with great portability have been proposed which include an optical system referred to as a bending optical system and having an optical axis bent 90 degrees by a prism or a mirror.

Japanese Patent Laid-Open No. H02(1990)-66536 has disclosed an image stabilization apparatus in which a correction optical system is cantilever-supported by at least three flexible (elastic) supporting rods extending in parallel with an optical axis and having equal lengths.

Japanese Patent Laid-Open No. 2002-207148 has disclosed an image stabilization apparatus in which an image-pickup lens member is supported movably in a direction orthogonal to an optical axis by fixing one ends of four flexible members in the optical axis direction to the image-pickup lens member and securing the other ends thereof to a substrate.

In these publications, plural flexible members for supporting the correction optical system are arranged at equal angular intervals about the optical axis and at uniform distances in the diameter direction. For example, in the apparatus disclosed in Japanese Patent Laid-Open No. H02(1990)-66536, the three flexible members are disposed at equal angular intervals of 120 degrees to form the vertexes of a regular triangle around the optical axis. In the apparatus disclosed in Japanese Patent Laid-Open No. 2002-207148, the four flexible members are arranged symmetrically with respect to the optical axis, that is, at the corners of a square.

In the apparatuses disclosed in the abovementioned publications, an actuator is placed such that the vector of drive force of the actuator (or the extension thereof) for shifting the correction optical system passes through the optical axis.

When the image stabilization apparatus is incorporated in a camera which includes the bending optical system for satisfying the requirement of a thinner shape, the intended thinner shape may be inhibited by arranging the plural flexible members for supporting the correction optical system such that the members form the vertexes of a regular triangle or the corners of a square. It is thus preferable to arrange the plural flexible members such that they form the corners of a rectangle.

Carelessly changing the arrangement of the flexible members, however, may prevent the vector of drive force produced by the actuator from overlapping with the vector of restorative force of the flexible members to generate torque in the plane orthogonal to the optical axis of the correction optical system.

As a result, it is conceivable that an unnecessary rotational motion is produced as well as an essentially necessary translation motion of the correction optical system to reduce the accuracy of image stabilization (that is, image shake correction).

BRIEF SUMMARY OF THE INVENTION

The present invention provides an image stabilization apparatus which provides enhanced accuracy in image stabilization and an optical apparatus including the image stabilization apparatus.

According to an aspect, the present invention provides an image stabilization apparatus including a movable member which is movable relative to a fixed member of the apparatus to achieve image stabilization, plural flexible members which movably support the movable member at least in a direction orthogonal to an optical axis of the apparatus, a portion of each of the flexible members on one end side in a direction along the optical axis being fixed to the fixed member and a portion of each of the flexible members on the other end side being fixed to the movable member. The apparatus further includes an actuator which drives the movable member. The flexural rigidity of at least one of the plural flexible members in the direction orthogonal to the optical axis is different from that of the other at least one flexible member in that direction so as to suppress rotation of the movable member driven by the actuator.

According to another aspect, the present invention provides an optical apparatus including the abovementioned image stabilization apparatus.

Other objects and features of the present invention will be apparent from the following description of preferred embodiments with reference to the accompanying drawings.

DETAILED DESCRIPTION OF THE PREFERRED EMBODIMENTS

Preferred embodiments of the present invention will hereinafter be described with reference to the drawings.

Embodiment 1

Figures 1A, 1B:
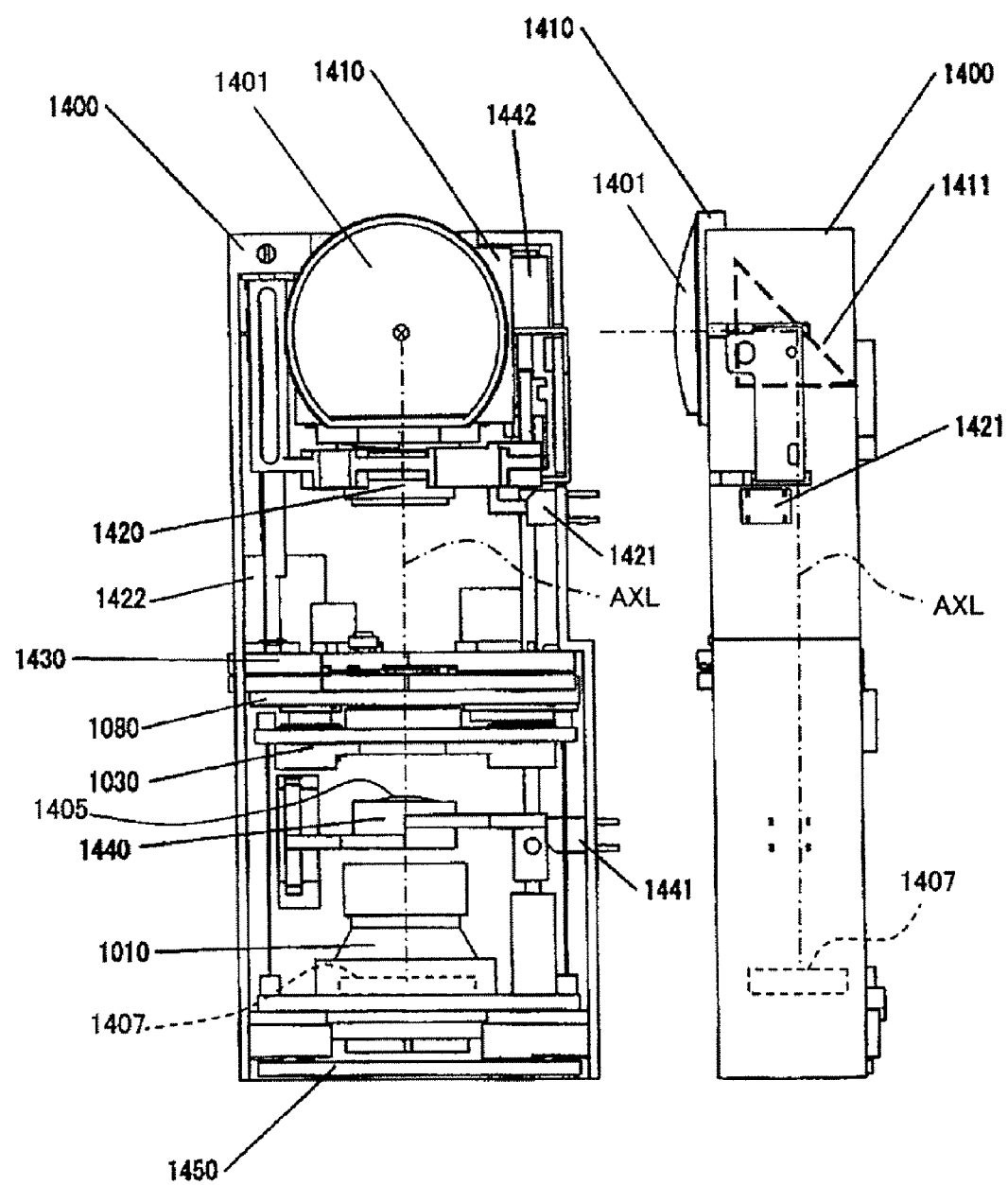
FIGS. 1A and 1B are a front view and a side view, respectively, showing an image-pickup apparatus which is Embodiment 1 of the present invention.
Figure 2:
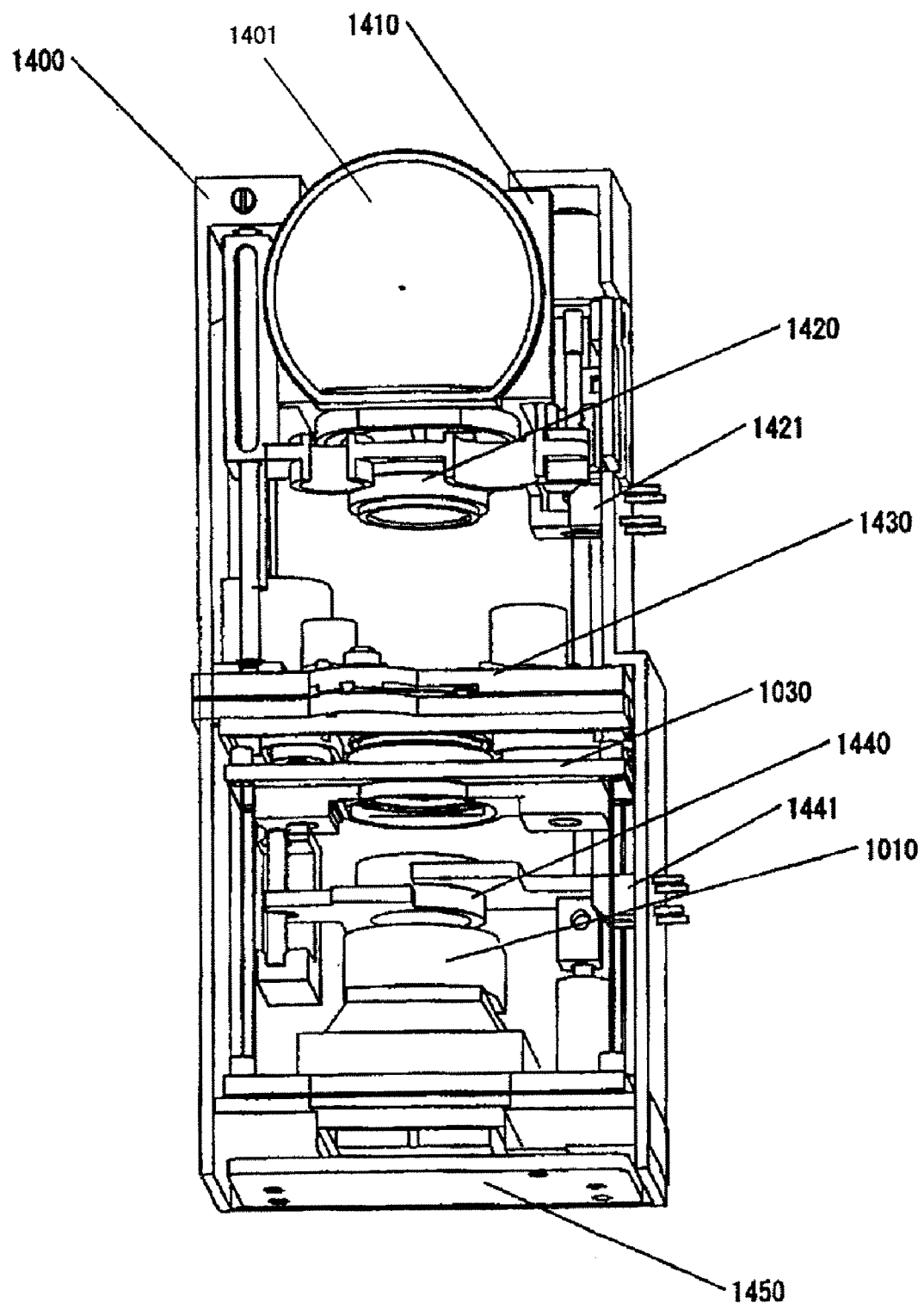
FIG. 2 is a perspective view showing the image-pickup apparatus of Embodiment 1 in a wide-angle state.
Figure 3:
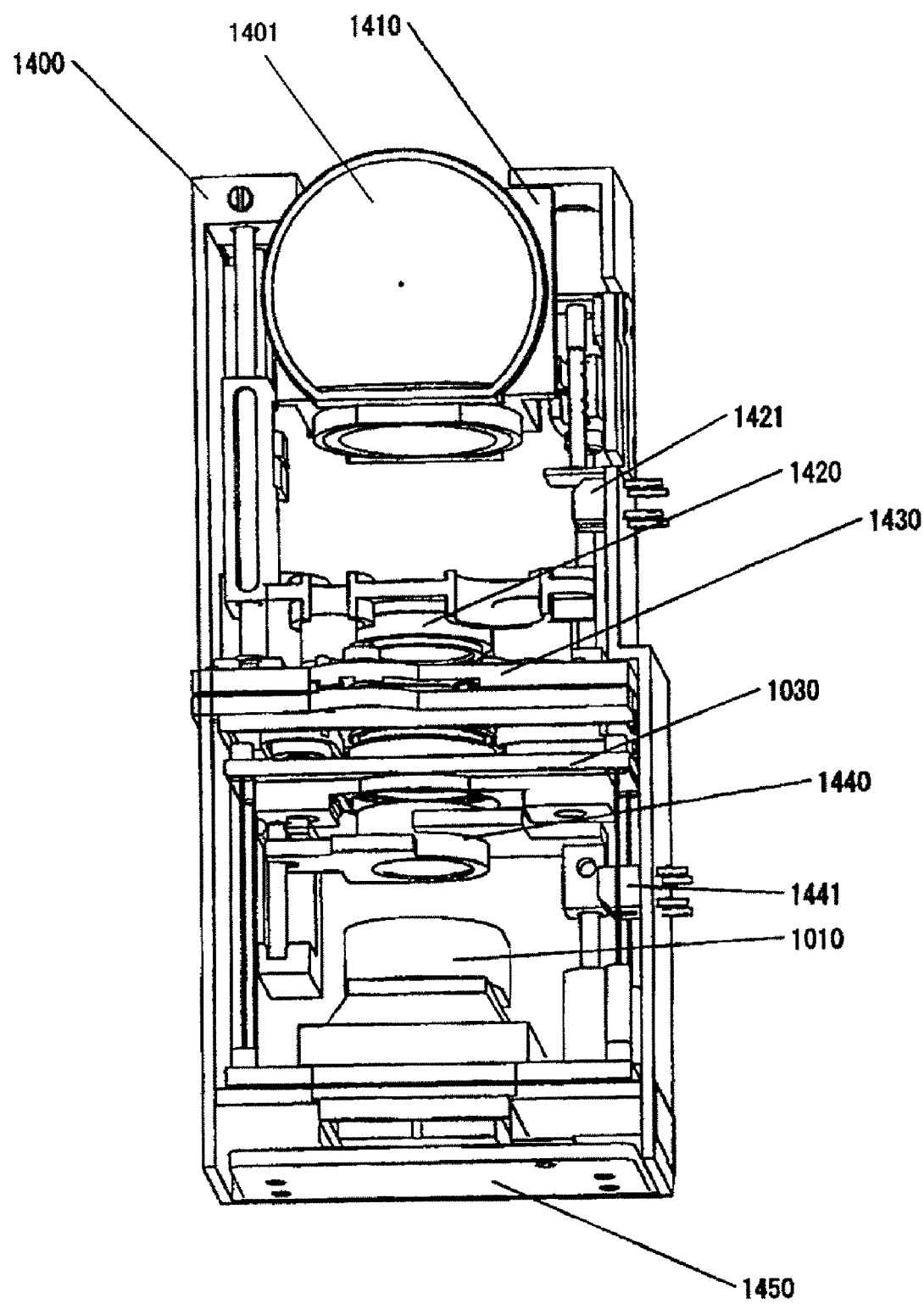
FIG. 3 is a perspective view showing the image-pickup apparatus of Embodiment 1 in a telephoto state.
Figures 4A, 4B:
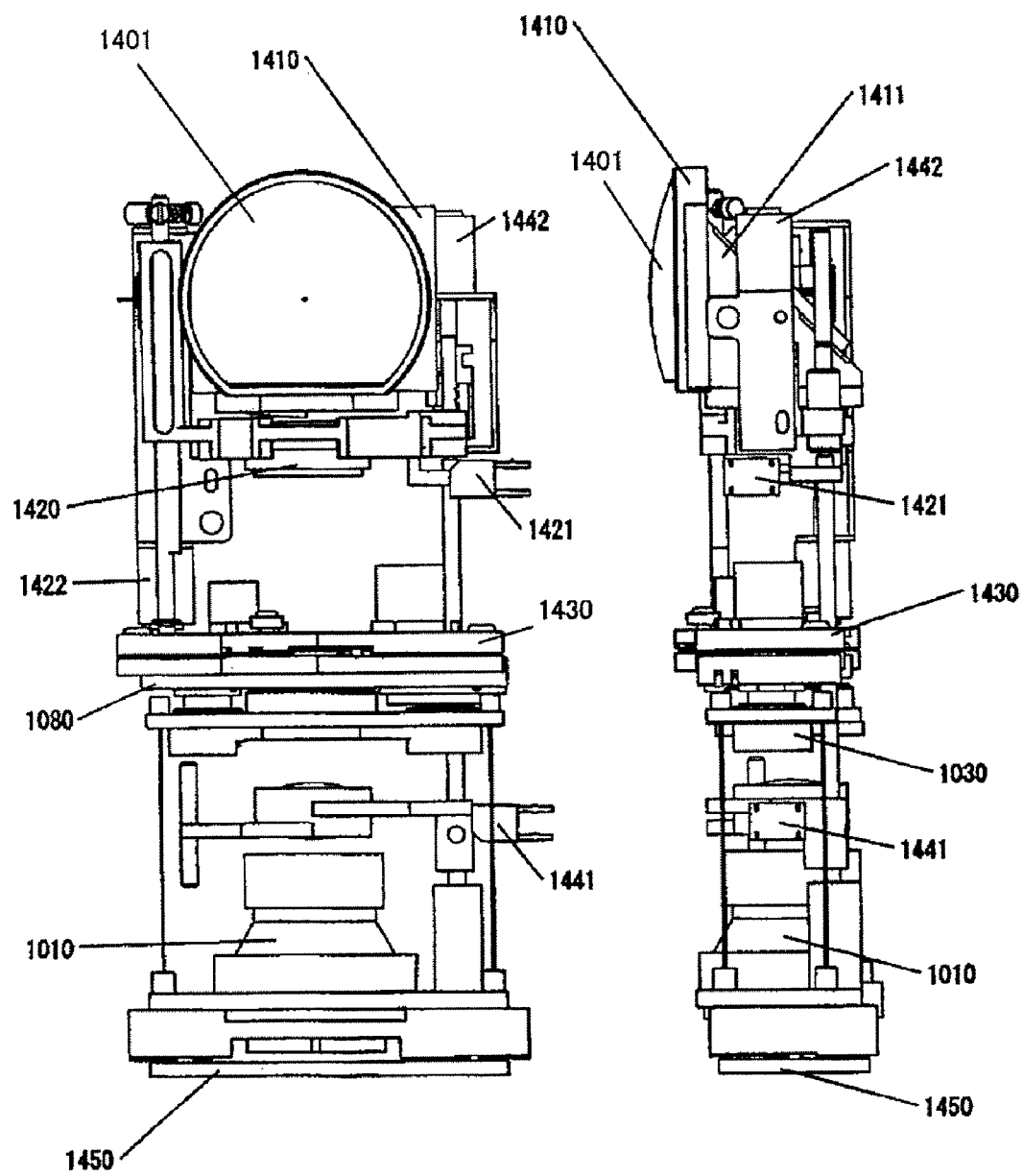
FIGS. 4A and 4B are a front view and a side view, respectively, showing the image-pickup apparatus of Embodiment 1 from which a fixed barrel is omitted.
Figure 5:
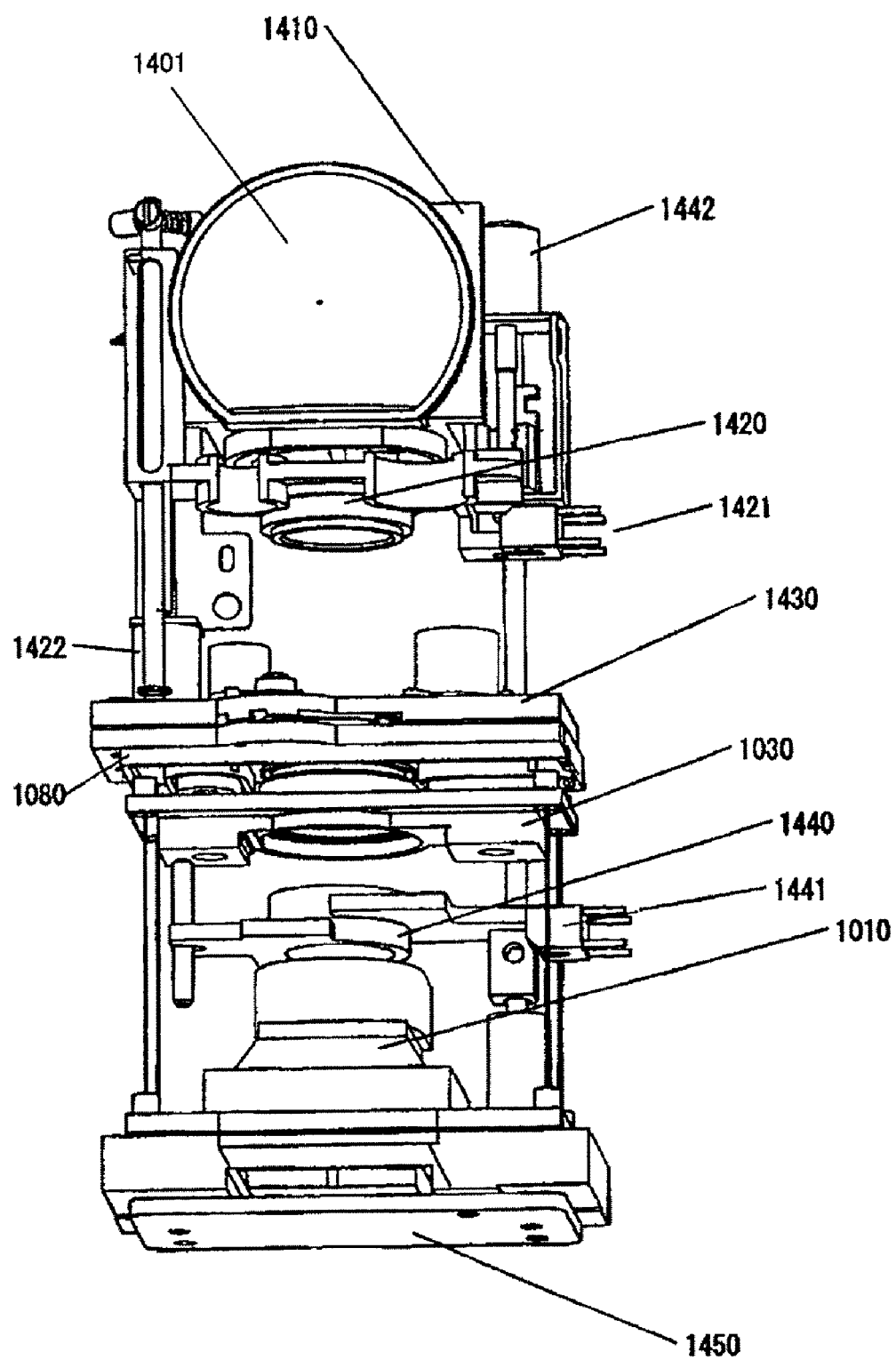
FIG. 5 is a perspective view showing the image-pickup apparatus of Embodiment 1 from which the fixed barrel is omitted.

FIGS. 1A and 1B are a front view and a side view, respectively, of a lens barrel portion of an image-pickup apparatus which is Embodiment 1 of the present invention. FIG. 2 is a perspective view showing the lens barrel portion in a wide-angle state. FIG. 3 is a perspective view showing the lens barrel portion in a telephoto state. FIGS. 4A, 4B, and 5 are a front view, a side view, and a perspective view, respectively, of the lens barrel portion from which a fixed barrel is omitted.

The structure of an image-pickup optical system housed in the lens barrel portion will be described first.

The image-pickup optical system is a zoom optical system formed of six lens units and corresponds to a bending optical system including a prism placed between a first lens unit and a second lens unit to bend the optical axis by 90 degrees.

In the side view of FIG. 1B, an object, not shown, whose image is picked up is present on the left. A luminous flux from the object passes through a first lens unit 1401 held by a first lens frame 1410 and is bent downward by a prism 1411 placed at the back of the first lens unit 1401.

Then, the luminous flux passes through a second lens unit (not shown) held by a second lens frame 1420, a third lens unit (shown in another figure) held by a coil holding member 1080, a fourth lens unit (shown in another figure) held by a lens holding member 1030, a fifth lens unit 1405 held by a fifth lens frame 1440, and a sixth lens unit (shown in another figure) held by a base support member (fixed member) 1010, and forms an object image on an image-pickup element 1407 formed of a CCD sensor or a CMOS sensor held by an image-pickup element holding plate 1450. The fourth lens unit corresponds to a correction optical system which is movable in a direction (on a plane) orthogonal to part of an optical axis of the image-pickup optical system from the prism 1411 to the image-pickup element 1407 (hereinafter referred to as an optical axis AXL) to correct image shake.

The second lens frame 1420 is movable in the optical axis direction by a stepping motor 1422. The initial position of the second lens frame 1420 in the optical axis direction is detected by part thereof passing through a PI (photo interrupter) 1421 for the second lens unit. The subsequent position of the second lens frame 1420 in the optical axis direction is determined by counting the number of drive pulses for the stepping motor 1422.

The fifth lens frame 1440 is movable in the optical axis direction by a stepping motor 1442. The initial position of the fifth lens frame 1440 in the optical axis direction is detected by part thereof passing through a PI (photo interrupter) 1441 for the fifth lens unit.

The subsequent position of the fifth lens frame 1440 is determined by summing the number of drive pulses for the stepping motor 1442.

In zooming for changing the magnification in image-pickup operation, the second lens frame 1420 which holds the second lens unit is moved vertically in the figures between the wide-angle state shown in FIG. 2 and the telephoto state shown in FIG. 3. To change the wide-angle state into the telephoto state, the second lens frame 1420 and the fifth lens frame 1440 are moved toward the third lens unit. This can magnify the object image.

When the second lens frame 1420 and the fifth lens frame 1440 are moved in the opposite directions, zooming can be performed from the telephoto state to the wide-angle state.

In focusing operation for focusing the image-pickup optical system on an object at a certain focus length, that is, in a certain zoom state, the fifth lens frame 1440 is moved toward the fourth lens unit by the stepping motor 1442. This can achieve focusing on objects at various focal lengths from infinity to closest distance. Whether the focusing is achieved or not is determined in a contrast detection method AF in which the fifth lens unit 1405 is moved such that the contrast of an object image picked up by the image-pickup element 1407 becomes the maximum level.

A shutter unit 1430 is secured to a fixed barrel 1400 between the second lens frame 1420 and the coil holding member 1080. The shutter unit 1430 opens or closes shutter blades in picking up images to properly control the amount of light entering the image-pickup element 1407.

Figure 6:
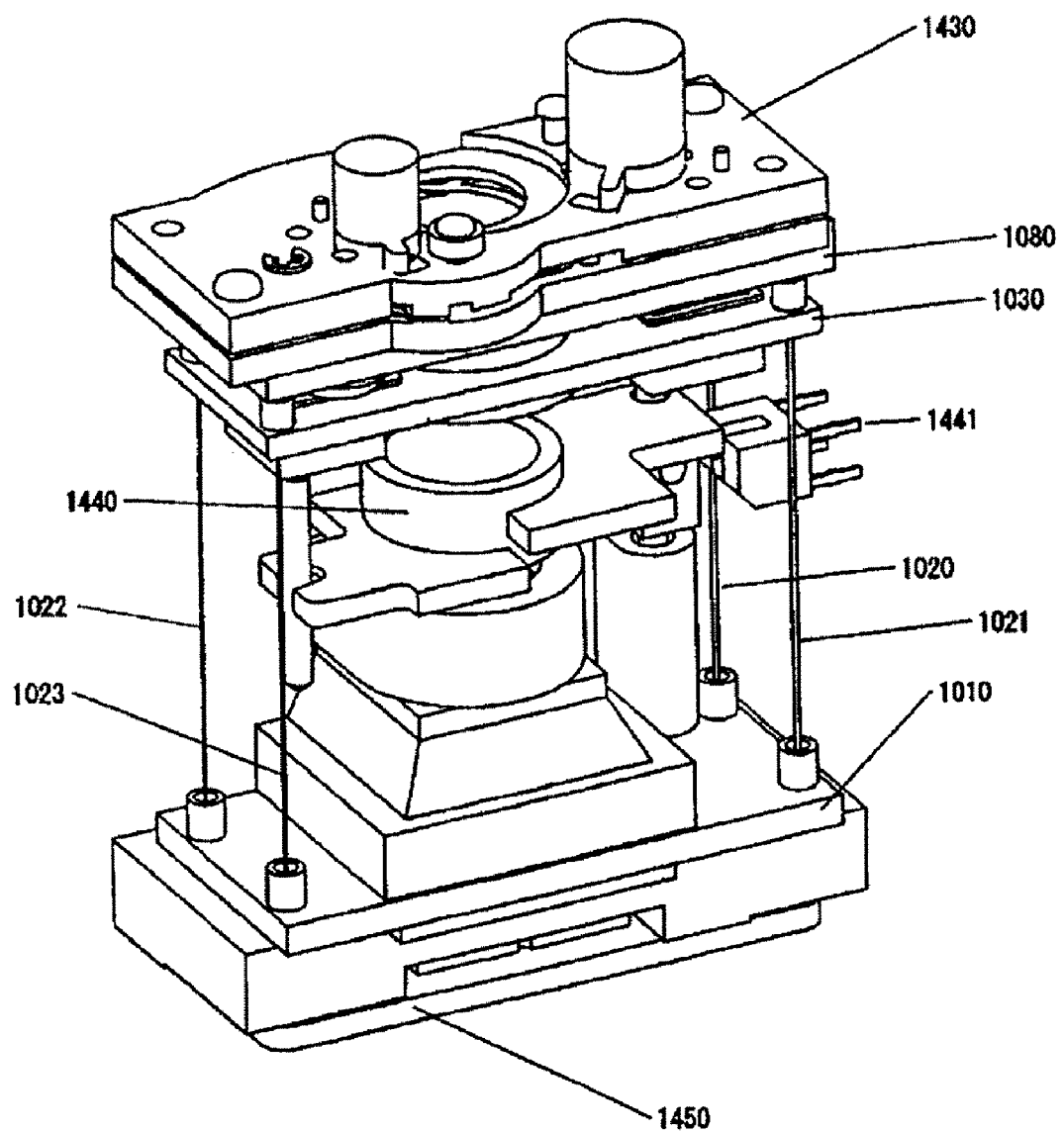
FIGS. 6 and 7 are perspective views showing the structure of an image stabilization apparatus and its surroundings in the image-pickup apparatus of Embodiment 1.

The positional relationship of the shutter unit 1430, the fifth lens frame 1440, and the image stabilization apparatus are shown in FIG. 6. The positional relationship of the fifth lens frame 1440 and the image stabilization apparatus are shown in FIG. 7.

Figure 7:
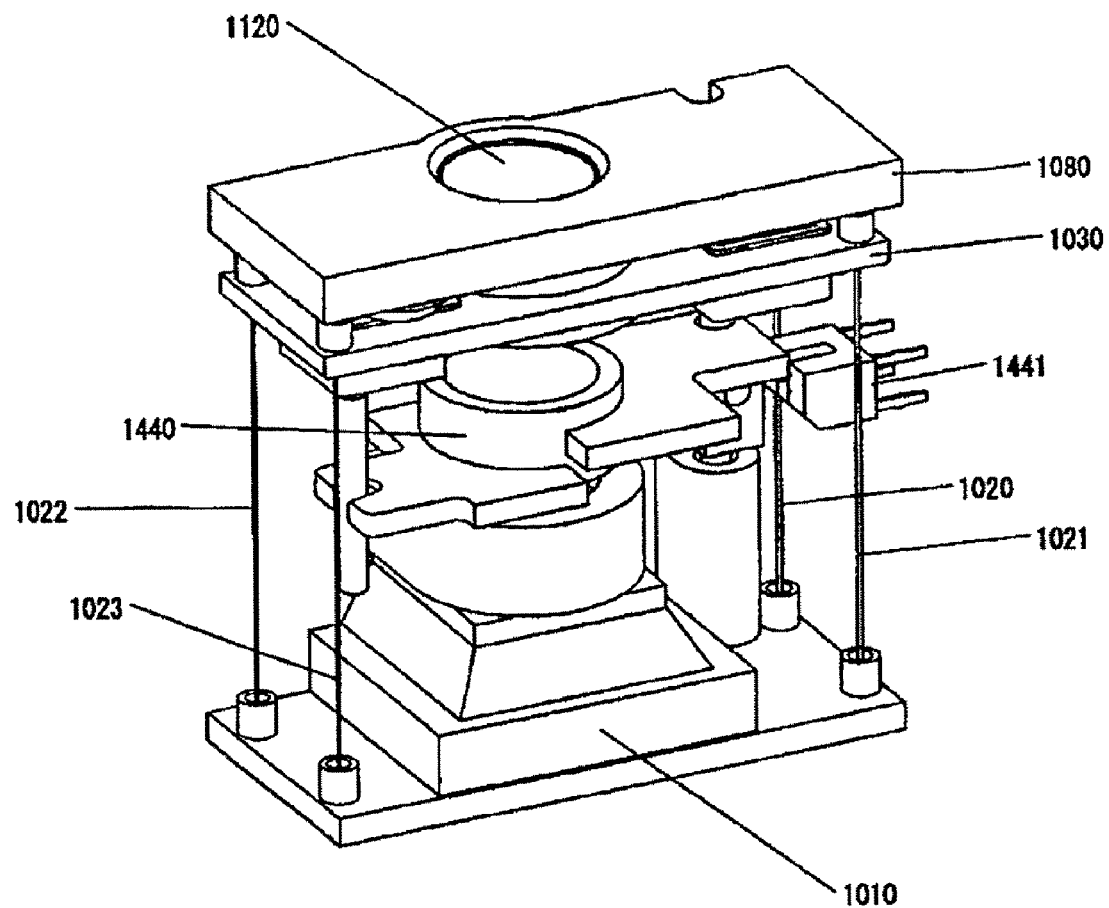

As shown in FIG. 7, the third lens unit 1120 is held by the coil holding member 1080.

Figure 8:
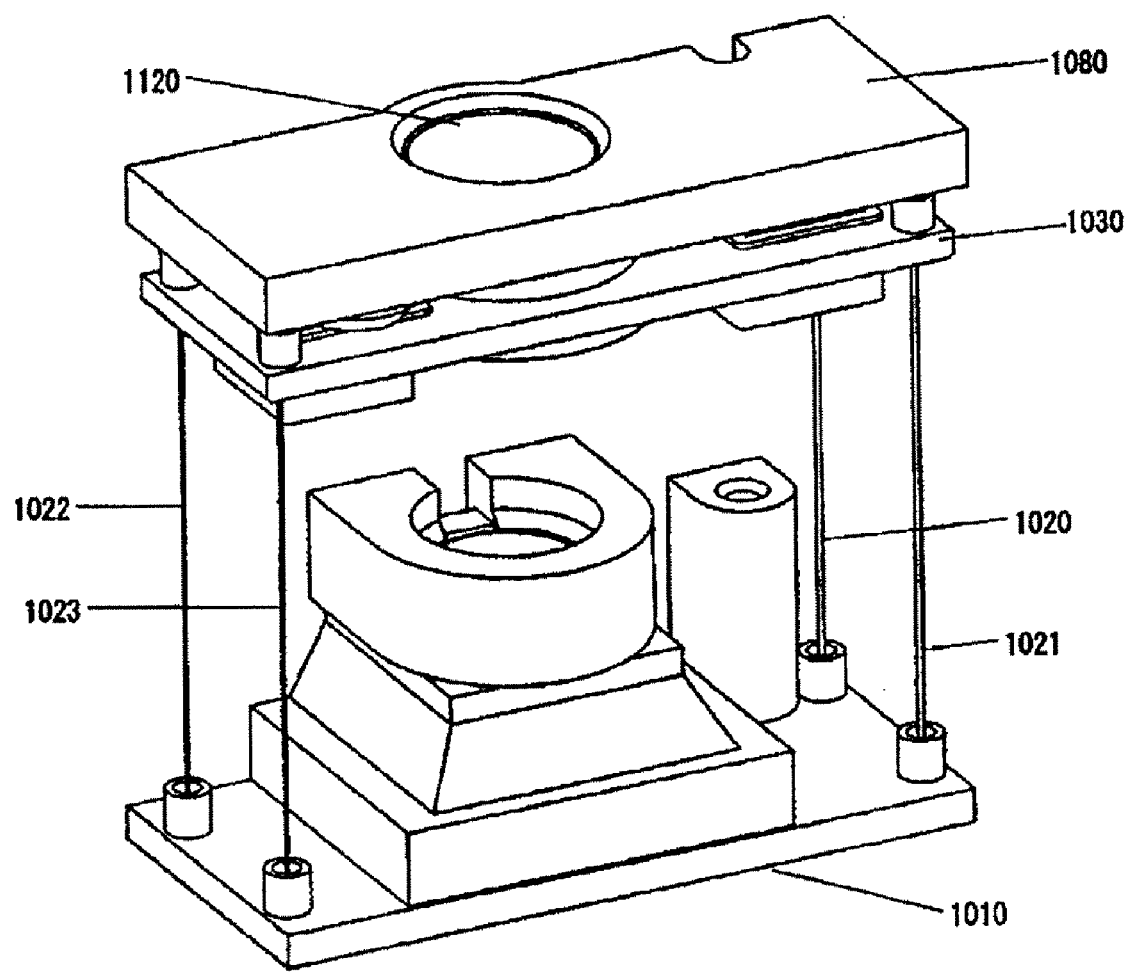
FIG. 8 is a perspective view showing the image stabilization apparatus in Embodiment 1.
Figure 9:
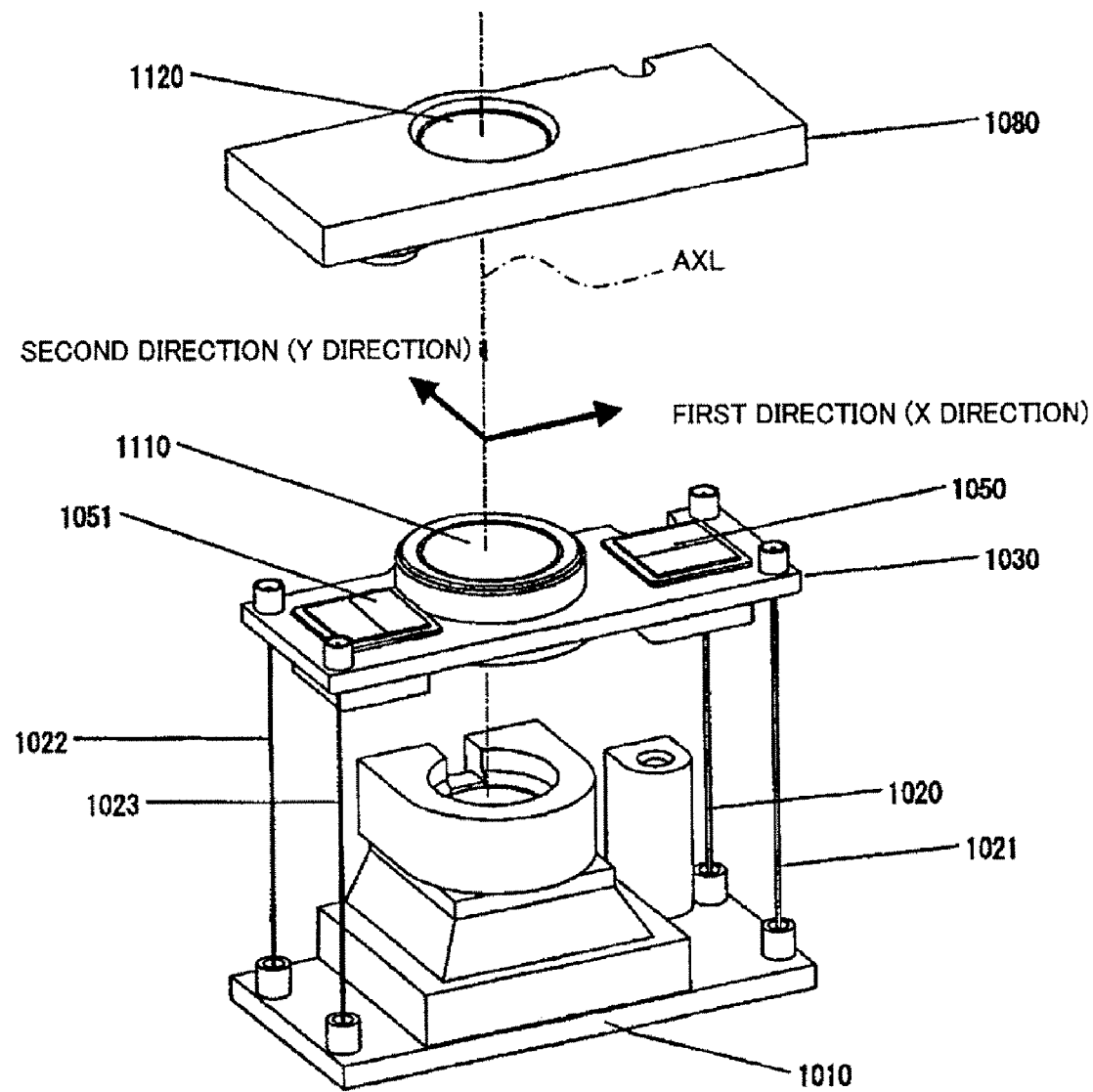
FIGS. 9 and 10 are perspective views showing the image stabilization apparatus from which a coil holding member is separated in Embodiment 1.
Figure 10:
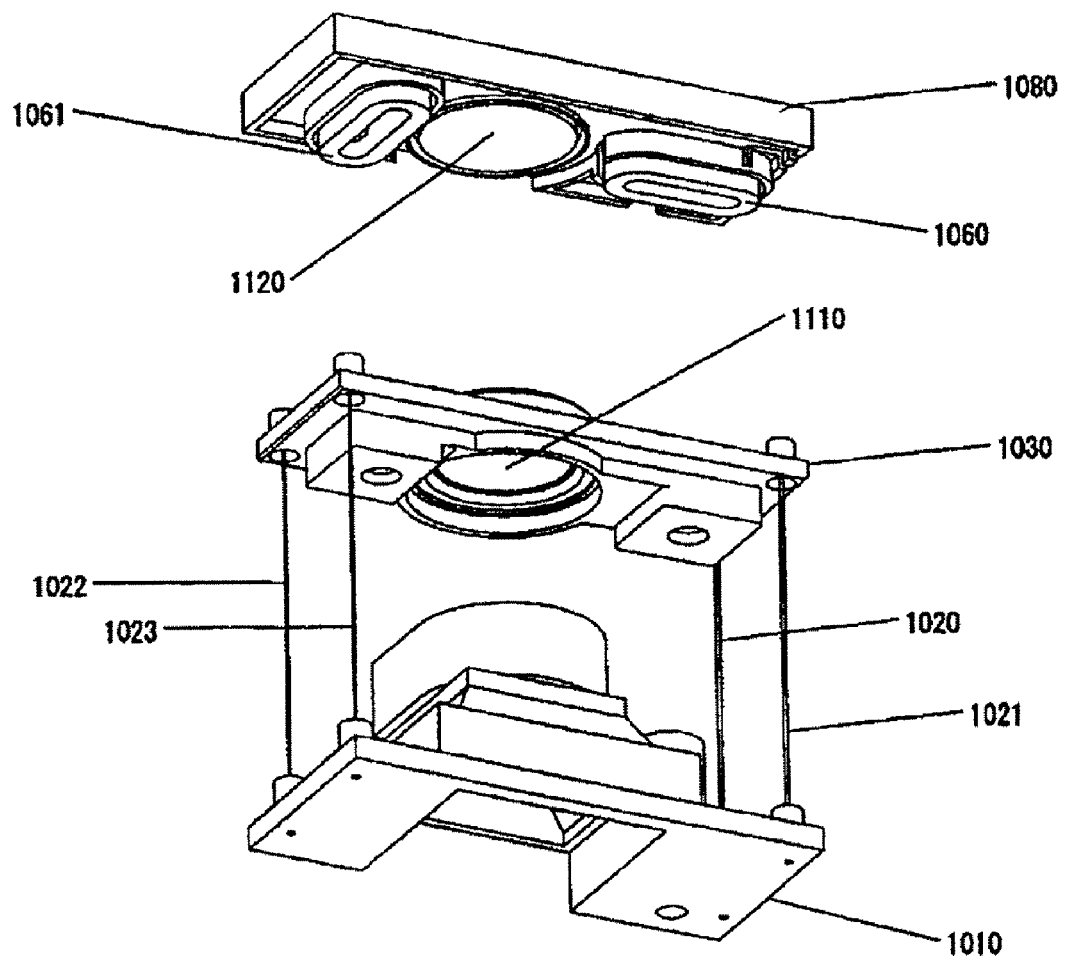

FIG. 8 is a perspective view showing only the image stabilization apparatus in the lens barrel portion. FIGS. 9 and 10 are perspective views showing the image stabilization apparatus from which the coil holding member 1080 is separated.

A fourth lens unit 1110 serving as a correction lens is held by the lens holding member 1030 serving as a movable member. The lens holding member 1030 is cantilever-supported on the base support member 1010 by four wires 1020 to 1023 which are flexible members with elasticity. The wires 1020 to 1023 have the same lengths, extend in parallel with the optical axis AXL, and are arranged at equal distances from the optical axis AXL. However, the wires 1020 to 1023 do not necessarily need to be parallel with the optical axis AXL, and it is essential only that the one end side portions thereof in the direction along the optical axis AXL are fixed to the base support member 1010 and the other end side portions are connected, that is, fixed to the lens holding member 1030.

The wires 1020 to 1023 are arranged to form the corners of a rectangle when viewed from the optical axis direction. Specifically, the distance between the wires 1021 to 1023 and the distance between the wires 1020 and 1022 are greater than the distance between the wires 1020 and 1021 and the distance between the wires 1022 and 1023.

As shown in FIG. 9, the lens holding member 1030 and the fourth lens unit 1110 move in a first direction (X direction) and a second direction (Y direction) which are orthogonal to the optical axis to correct image shake. The movement of the lens holding member 1030 bends the wires 1020 to 1023 due to their elasticity.

Figure 11:
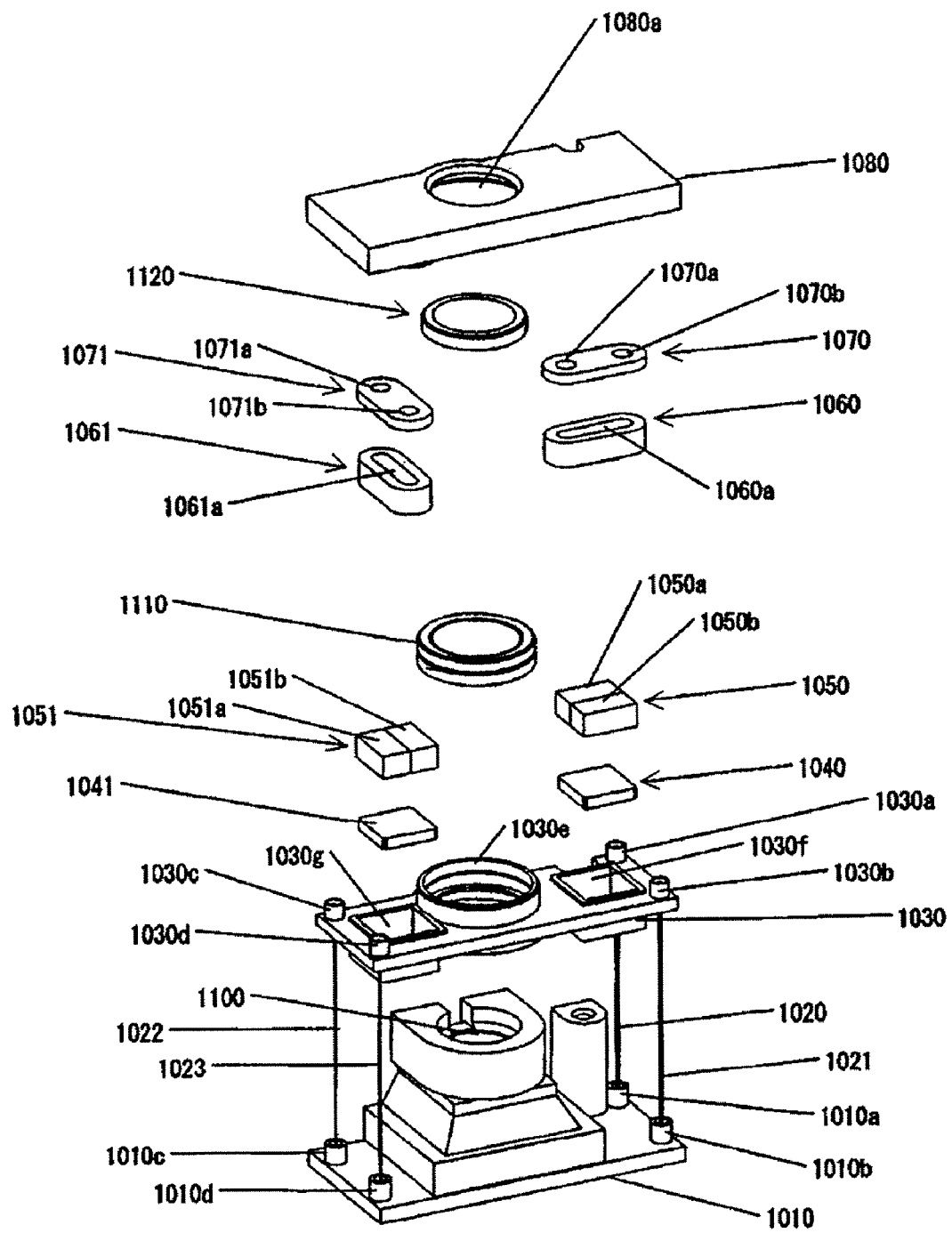
FIGS. 11 and 12 are exploded views of the image stabilization apparatus in Embodiment 1 shown in perspective views.
Figure 12:
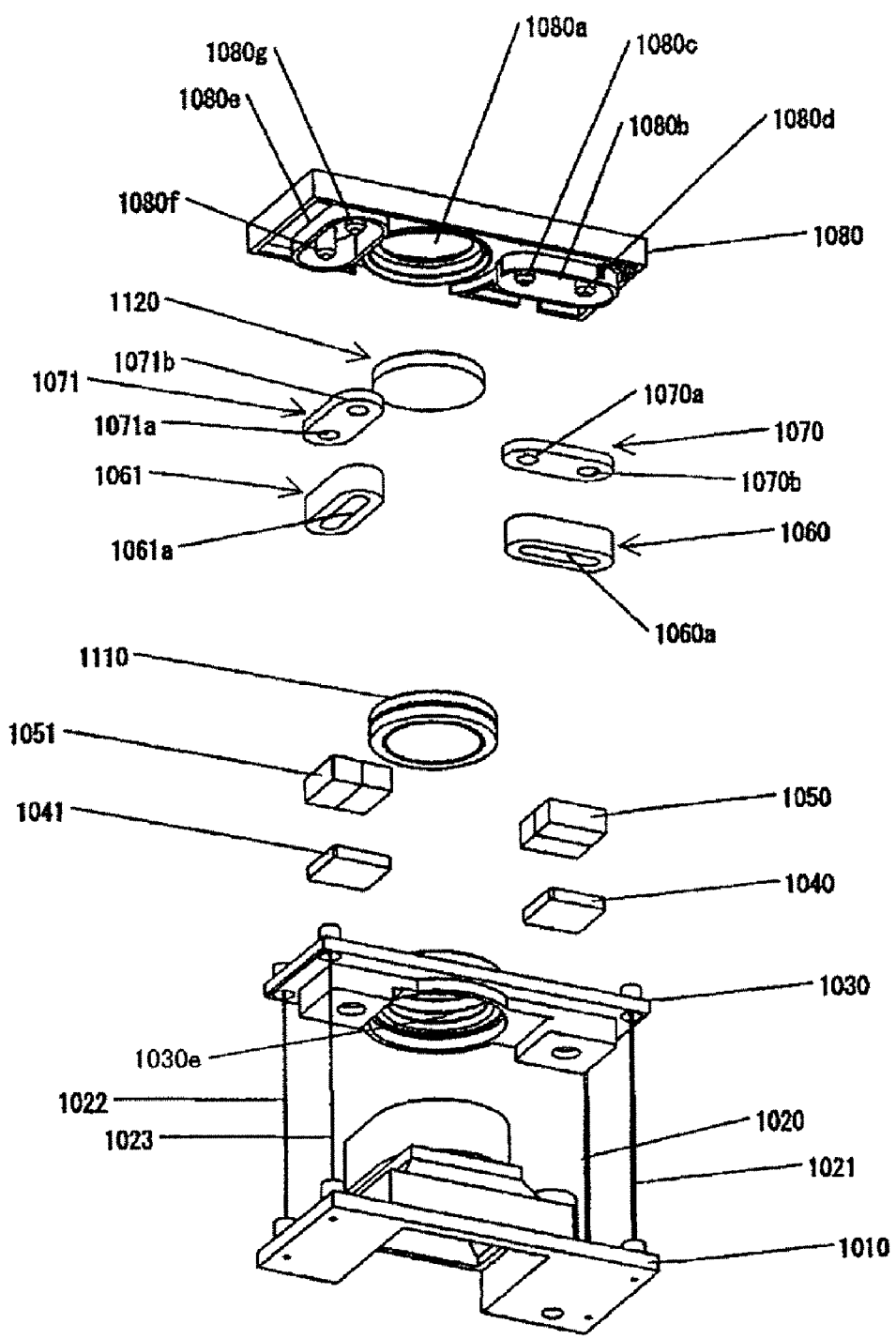

FIGS. 11 and 12 are exploded views of the image stabilization apparatus. As shown in FIG. 11, the sixth lens unit 1100 is held by the base support member 1010.

The assembly procedure of part of the image stabilization apparatus including magnets will be described with reference to FIG. 13.

Figure 13:
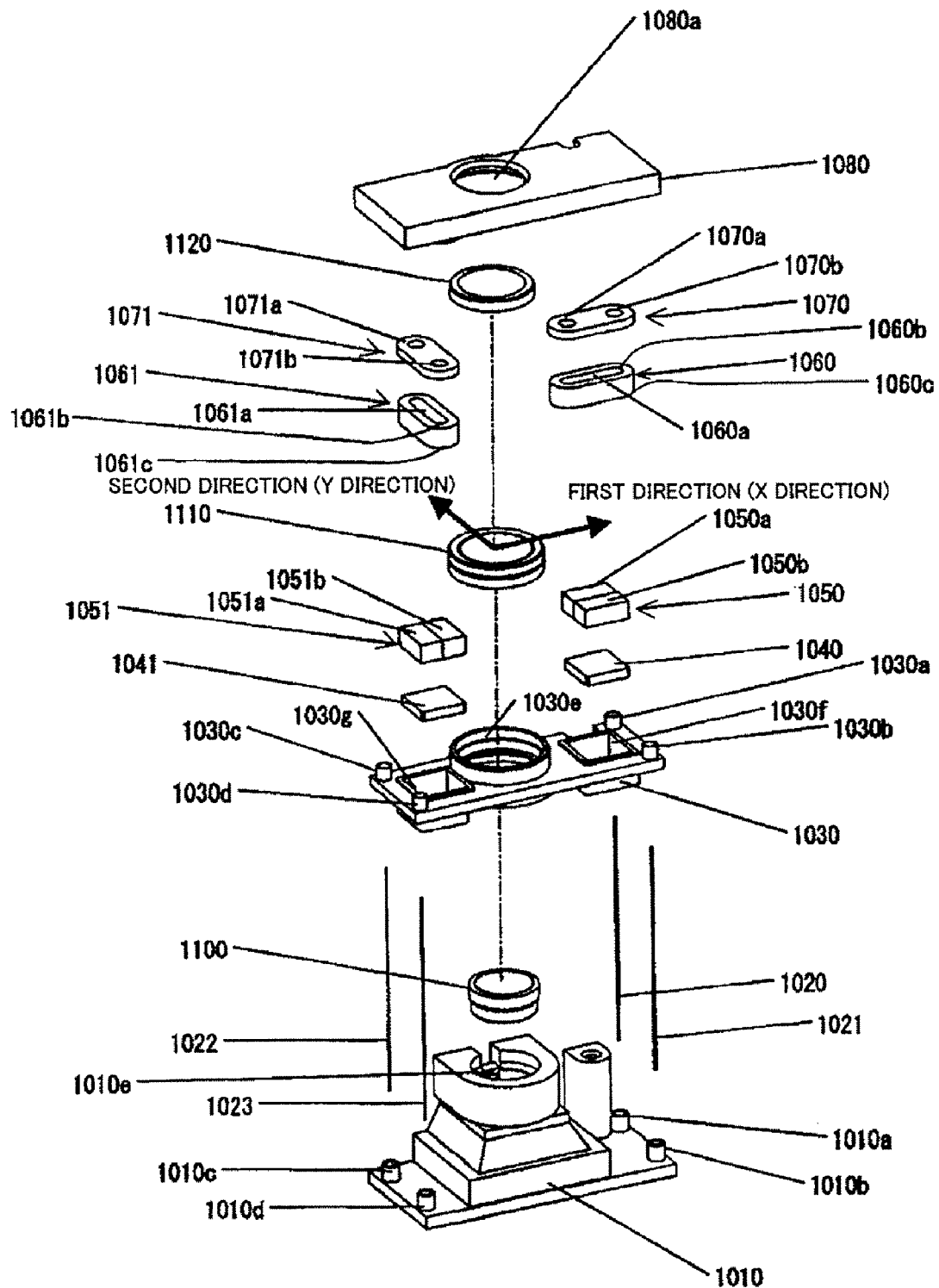
FIG. 13 is a perspective view for explaining the assembly procedure of part of the image stabilization apparatus in Embodiment 1 including magnets.

FIG. 13 is a perspective view of the image stabilization apparatus shown in an exploded view in the optical axis direction.

The sixth lens unit 1100 is incorporated into a lens holding portion 1010e formed at the center of the base support member 1010. Wire fixing portions 1010a, 1010b, 1010c, and 1010d are formed to fix the lower end portions of the wires 1020 to 1023 at four corners of the base support member 1010. The lower end portions of the four wires 1020 to 1023 are adhered and fixed to hole portions formed at the centers of the wire fixing portions 1010a to 1010d, respectively.

The upper end portions of the four wires 1020 to 1023 are inserted into wire fixing portions 1030a, 1030b, 1030c, and 1030d formed at four corners of the lens holding member 1030, respectively, and adhered and fixed thereto.

In Embodiment 1, the wires 1020 and 1021 have a diameter of 0.29 mm, and the wires 1022 and 1023 have a diameter of 0.18 mm. All the wires 1020 to 1023 are made of stainless steel and the surfaces thereof are painted black to reduce surface reflection.

The fourth lens unit 1110 is secured to a lens fixing portion 1030e formed at the center of the lens holding member 1030.

A magnet 1050 is magnetized such that the front face of a first portion 1050a (upper surface in FIG. 11) serves as the north pole, the back face (lower surface in FIG. 11) thereof serves as the south pole, the front face of a second portion 1050b serves as the south pole, and the back face thereof serves as the north pole. A magnet 1051 is also magnetized such that the front face and the back face of a first portion 1051a serve as the north pole and the south pole, respectively, and the front face and the back face of a second portion 1051b serve as the south pole and the north pole, respectively.

A rectangular yoke 1040 made of an iron material and the magnet 1050 are fitted into and adhered to a rectangular hole 1030f formed at a part of the lens holding member 1030 which is closer to its one end than its center in the longitudinal direction (+X direction) The magnet 1050 is fixed such that the front face of the first portion 1050a corresponds to the north pole and the split line between the north pole and the south pole on the front face extends in the first direction (X direction).

A rectangular yoke 1041 made of an iron material and the magnet 1051 are fitted into and adhered to a rectangular hole 1030g formed at a part of the lens holding member 1030 which is closer to its other end than its center in the longitudinal direction (−X direction). The magnet 1051 is fixed such that the front face of the second portion 1051b corresponds to the south pole and the split line between the north pole and the south pole on the front face extends in the second direction (Y direction).

Figure 14:
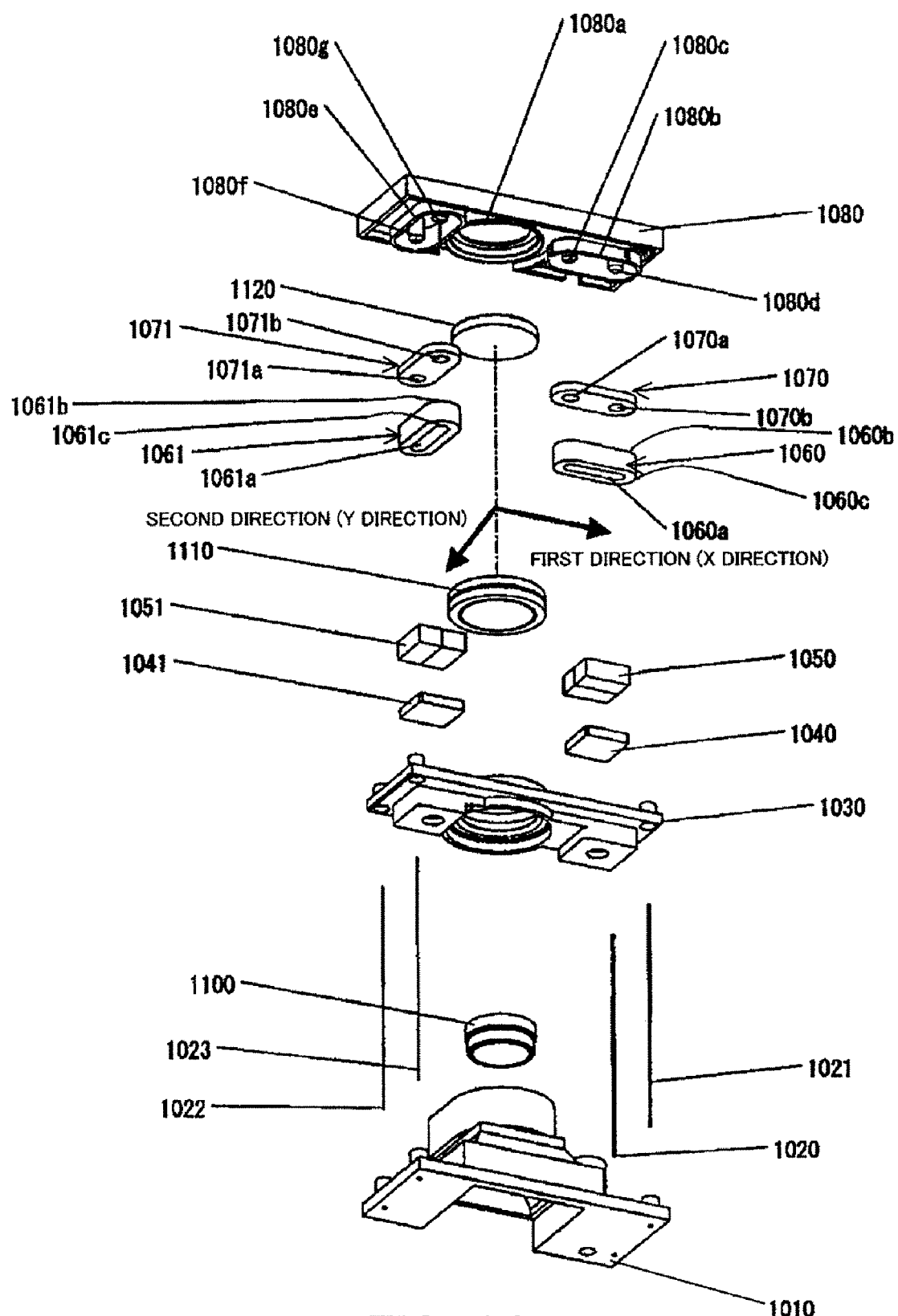
FIG. 14 is a perspective view for explaining the assembly procedure of part of the image stabilization apparatus in Embodiment 1 including coils.

Next, the assembly procedure of part of the image stabilization apparatus including coils will be described with reference to FIG. 14.

A coil 1060 is formed by several hundreds of turns of nichrome wire having a diameter of 0.08 mm in the shape of an oval and solidification with an adhesive. A long hole 1060a is opened at the center of the coil 1060. Both ends 1060b and 1060c of the coil 1060 are connected to a control circuit, not shown. The control circuit controls the direction and the amount of electric current applied to the coil 1060.

The third lens unit 1120 is fixed at a lens receiving portion 1080a formed at the center of the coil holding member 1080. An oval coil receiving hole 1080b is formed in part of the coil holding member 1080 on one side in the longitudinal direction.

A back yoke 1070 is adhered and secured to the coil receiving hole 1080b such that guide projections 1080c and 1080d formed inside the coil receiving hole 1080b are inserted into holes 1070a and 1070b of the back yoke 1070.

Next, the coil 1060 is fitted into the coil receiving hole 1080b and is adhered and fixed thereto with the guide projections 1080c and 1080d inserted into the hole 1060a of the coil 1060.

Similarly, an oval coil receiving hole 1080e is formed in part of the coil holding member 1080 on the other side in the longitudinal direction. A back yoke 1071 is adhered and fixed to the coil holding member 1080 such that guide projections 1080f and 1080g are inserted into holes 1071a and 1071b of the back yoke 1071.

Next, a coil 1061 is fitted into the coil receiving hole 1080e and is adhered and fixed thereto with the guide projections 1080f and 1080g inserted into the oval hole 1061a of the coil 1061.

The assembly is performed described above to complete a lens holding member side unit including the fourth lens unit 1110 serving as the correction optical system and the magnets 1050 and 1051, and a coil holding member side unit including the coils 1060 and 1061, as shown in FIGS. 9 and 10.

As shown in FIG. 3, the coil holding member side unit is secured to the fixed barrel 1400 on the side closer to the image-pickup element 1407 than the shutter unit 1430.

The lens holding member side unit is incorporated into the lens barrel portion by securing the base support member 1010 to the fixed barrel 1400 near the image-pickup element 1407.

Next, description will be made of the behavior of the lens holding member 1030 when an electric current is applied to the coils 1060 and 1061 with reference to FIGS. 15 to 19.

Figure 15:
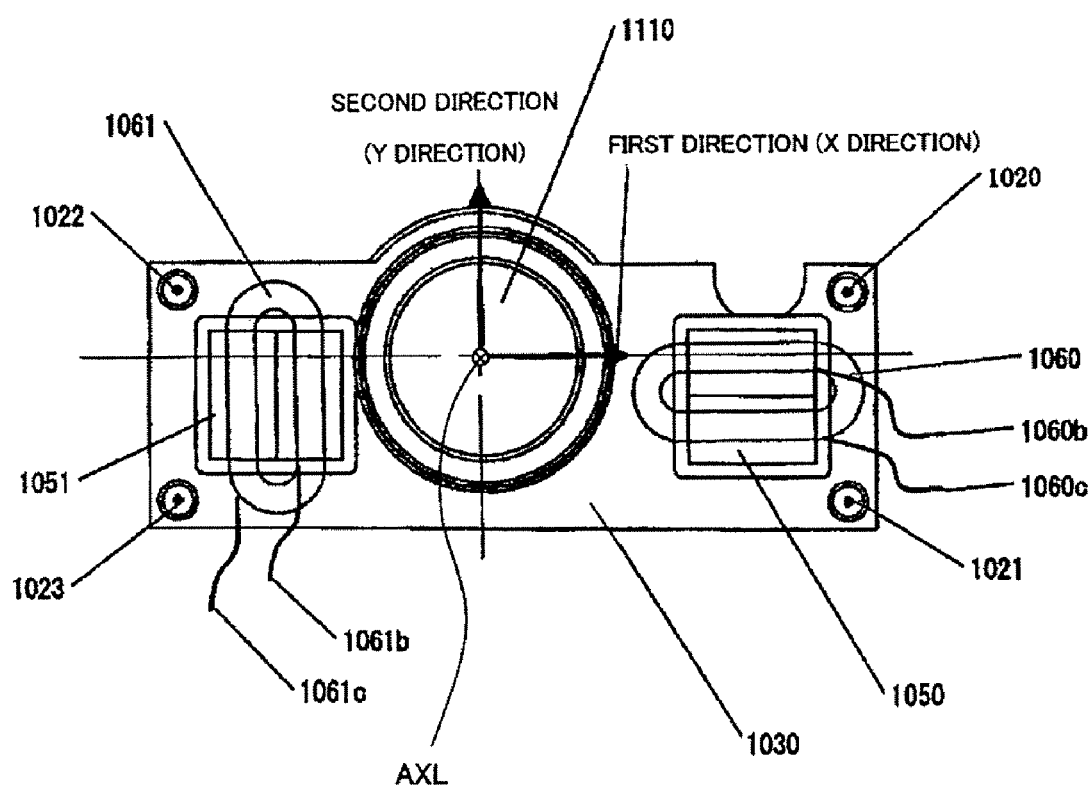
FIG. 15 is a front view showing the image stabilization apparatus in Embodiment 1 from which part thereof is omitted.

FIG. 15 is a top view showing the image stabilization apparatus from which a part thereof is omitted when viewed from above in the optical axis direction.

For ease of description, the coils 1060 and 1061 are shown transparently.

FIG. 15 shows the lens holding member 1030 displaceable in the plane perpendicular to the optical axis, the fourth lens unit 1110 fixed thereto, the magnets 1050 and 1051, and the wires 1020 to 1023. FIG. 15 also shows the coils 1060 and 1061 fixed to the coil holding member 1080. For ease of description, center lines in the first direction (X direction) defined rightward and the second direction (Y direction) defined upward relative to the optical axis AXL are shown.

Figure 16:
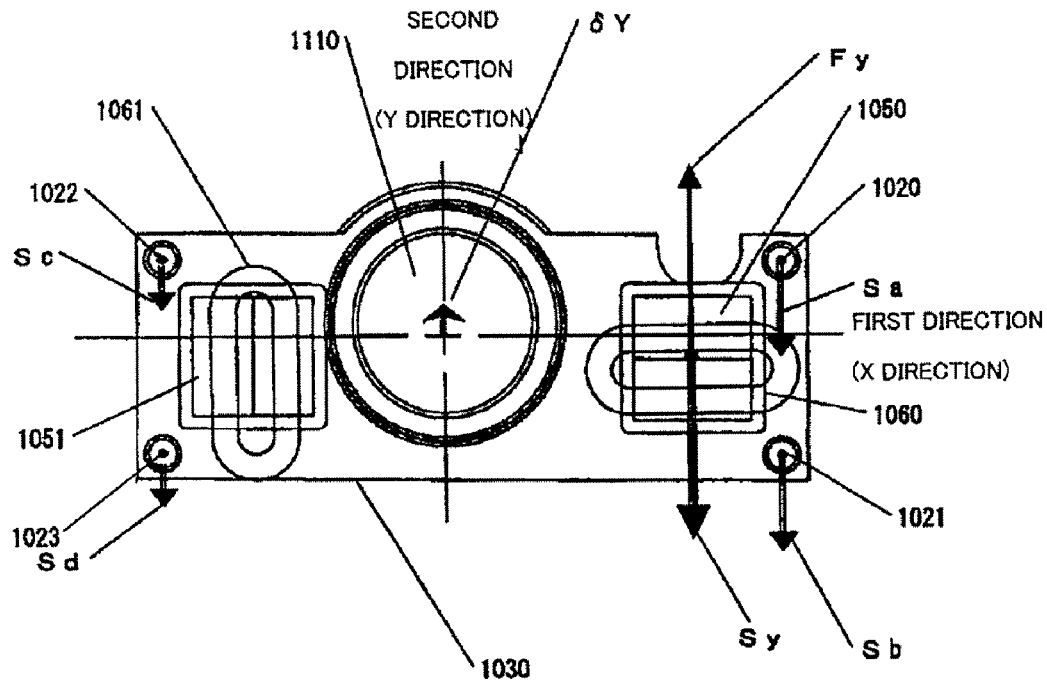
FIG. 16 is a top view showing the image stabilization apparatus in Embodiment 1 when it is driven in a +Y direction.

If an electric current of 150 mA is applied from the one end 1060b to the other end 1060c of the coil 1060, an electromagnetic drive force Fy is generated in the +Y direction on the magnet 1050 based on the principles of electromagnetism as shown in FIG. 16.

The electromagnetic force Fy displaces the fourth lens unit 1110 held by the lens holding member 1030 by δY=0.2 mm in the +Y direction. At this point, the end of the wire 1020 is bent by δY=0.2 mm to generate a reaction force (elastic force) Sa for returning the lens holding member 1030 in the −Y direction. Similarly, wire reaction forces Sb, Sc, and Sd are generated in the wires 1021 to 1023, respectively. Since the wires 1020 and 1021 have the larger diameter of 0.29 mm and the wires 1022 and 1023 have the smaller diameter of 0.18 mm, the wires 1020 and 1021 generate greater wire reaction forces even when the wire ends are displaced by the same amount.

Therefore, the vector of the total wire reaction force Sy including the four wire reaction forces Sa, Sb, Sc, and Sd is in the opposite direction to the vector of the electromagnetic drive force Fy on the same line and equals it. As a result, no torque is generated about the optical axis, and the lens holding member 1030 can be translated in the +Y direction by 0.2 mm without rotation. Thus, the fourth lens unit 110 can be translated in the +Y direction by 0.2 mm without rotation.

In other words, two of the four wires 1020 to 1023 have different flexural rigidity (bending rigidity) in the direction orthogonal to the optical axis direction from those of the other two wires in order to suppress rotation of the lens holding member 1030 driven by the actuator formed of the coil 1060 and the magnet 1050 in the plane orthogonal to the optical axis direction.

Suppressing the rotation (or no rotation) includes not only completely preventing rotational motion but also limiting rotation to a degree that the accuracy of image stabilization is reduced in an allowable range.

The elastic ratio between the wire reaction force (Sa+Sb) and the wire reaction force (Sc+Sd) is set to be substantially equal to the ratio between the distance from the center of the magnet 1050 to the wires 1022 and 1023 and the distance from the center of the magnet 1050 to the wires 1020 and 1021. For example, the ratio between the elastic ratio and the distance ratio is set to any value ranging from 0.8 to 1 to 1.2 to 1.

Since the lens holding member 1030 needs to be moved slightly for image stabilization, the wire reaction force may be considered as proportional to the moving amount (bend amount).

Figure 17:
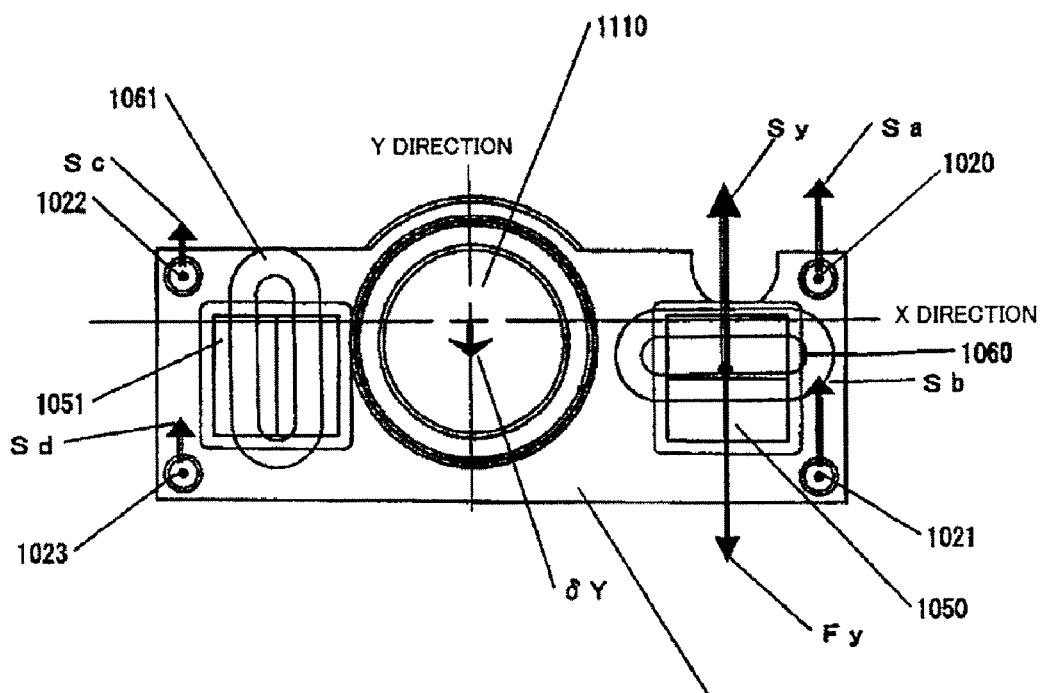
FIG. 17 is a top view showing the image stabilization apparatus in Embodiment 1 when it is driven in a −Y direction.

FIG. 17 shows the displacement when an electric current of 150 mA is applied to the coil 1060 in the opposite direction to that in FIG. 16. The lens holding member 1030 is displaced in the −Y direction by δY=0.2 mm by an electromagnetic drive force Fy generated in the −Y direction. At this point, the vector of the electromagnetic drive force Fy is in the opposite direction to the vector of the total wire reaction force Sy on the same line and equals it, so that no torque is generated about the optical axis, and the fourth lens holding member 1110 can be translated in the −Y direction by 0.2 mm without rotation.

Figure 18:
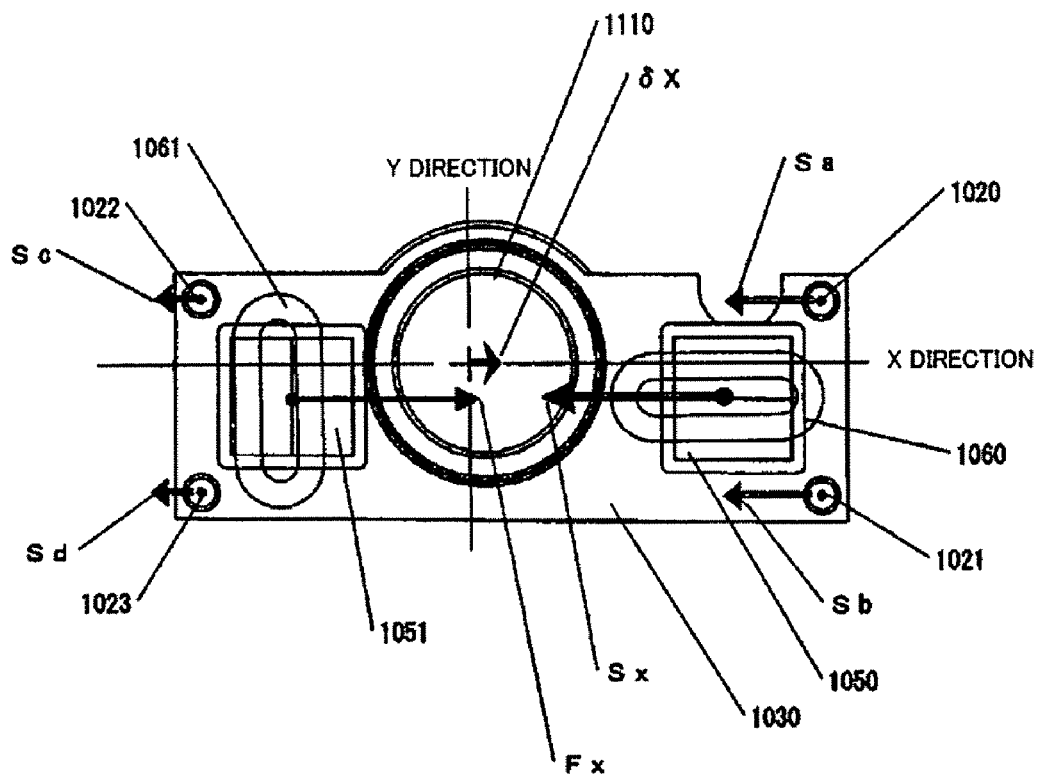
FIG. 18 is a top view showing the image stabilization apparatus in Embodiment 1 when it is driven in a +X direction.

FIG. 18 shows the displacement when no electric current is applied to the coil 1060 but an electric current of 150 mA is applied only to the coil 1061. The lens holding member 1030 is displaced in the +X direction by δX=0.2 mm by an electromagnetic drive force Fx generated in the +X direction. At this point, since the wire reaction forces Sa, Sc and the wire reaction forces Sb, Sd act at symmetrical positions in the vertical direction with respect to the point where the electromagnetic force Fx is generated, the vector of the total wire reaction force Sx is in the opposite direction to the vector of the electromagnetic drive force Fx on the same line and equals it. For this reason, no torque is produced about the optical axis, and the fourth lens holding member 1110 can be translated in the +X direction by 0.2 mm.

Figure 19:
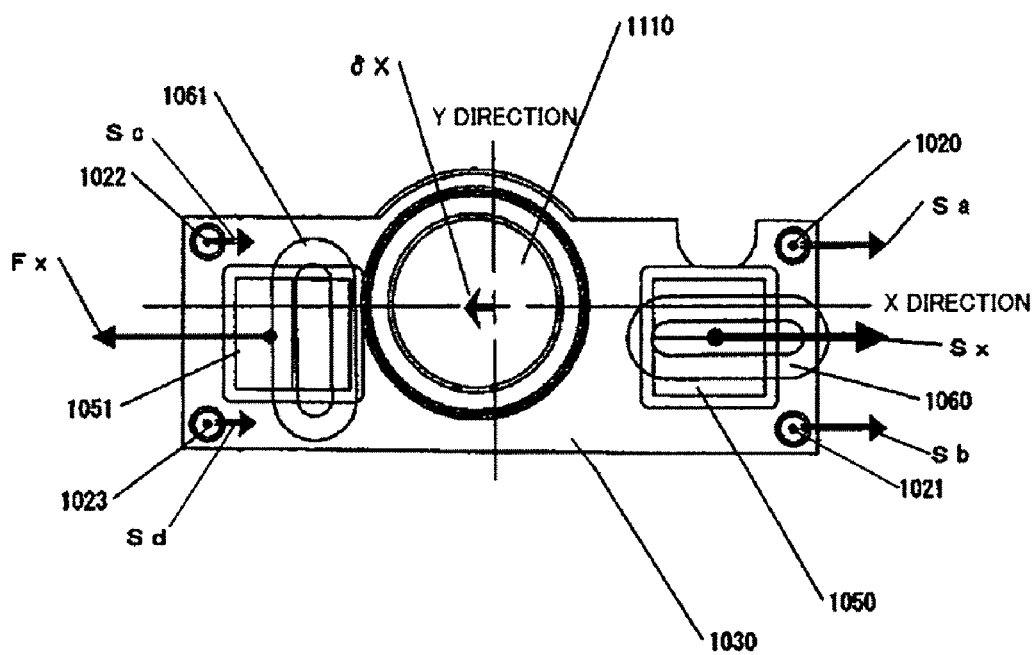
FIG. 19 is a top view showing the image stabilization apparatus in Embodiment 1 when it is driven in a −X direction.

FIG. 19 shows the displacement when an electric current of 150 mA is applied to the coil 1061 in the opposite direction to that in FIG. 18. The lens holding member 1030 is displaced in the −X direction by δX=0.2 mm by an electromagnetic drive force Fx generated in the −X direction. At this point, the vector of the total wire reaction force Sx is in the opposite direction to the vector of the electromagnetic drive force Fx on the same line and equals it, so that no torque is generated about the optical axis, and the fourth lens unit 1110 can be translated in the −X direction by 0.2 mm.

In this manner, the vector of the total wire reaction force Sy and the vector of the electromagnetic drive force Fy in the second direction (Y direction) generated in the coil 1060 are generated at the same point and in the opposite directions. In addition, the vector of the total wire reaction force Sx and the vector of the electromagnetic drive force Fx in the first direction (X direction) generated in the coil 1061 are generated at the points on the same line and in the opposite directions. In other words, the total wire reaction forces Sy and Sx are produced on the intersection of the vector direction of the electromagnetic drive force Fy generated in the coil 1060 and the vector direction of the electromagnetic drive force Fx generated in the coil 1061.

The fourth lens unit 1110 needs to be displaced by a certain amount simultaneously in the first direction (X direction) and the second direction (Y direction) for image stabilization, which can be performed by controlling the amount and the direction of an electric current applied to the coils 1060 and 1061. It is easily presumed from the combined results of FIG. 16 to FIG. 19 that the total wire reaction forces Sx and Sy and the electromagnetic drive forces Fx and Fy are generated at the same point or on the same line as those described above. Thus, the lens holding member 1030 can be translated without rotation when it is displaced arbitrarily. Therefore, the fourth lens unit 1110 can be translated in the XY plane without rotational motion.

Figure 20:
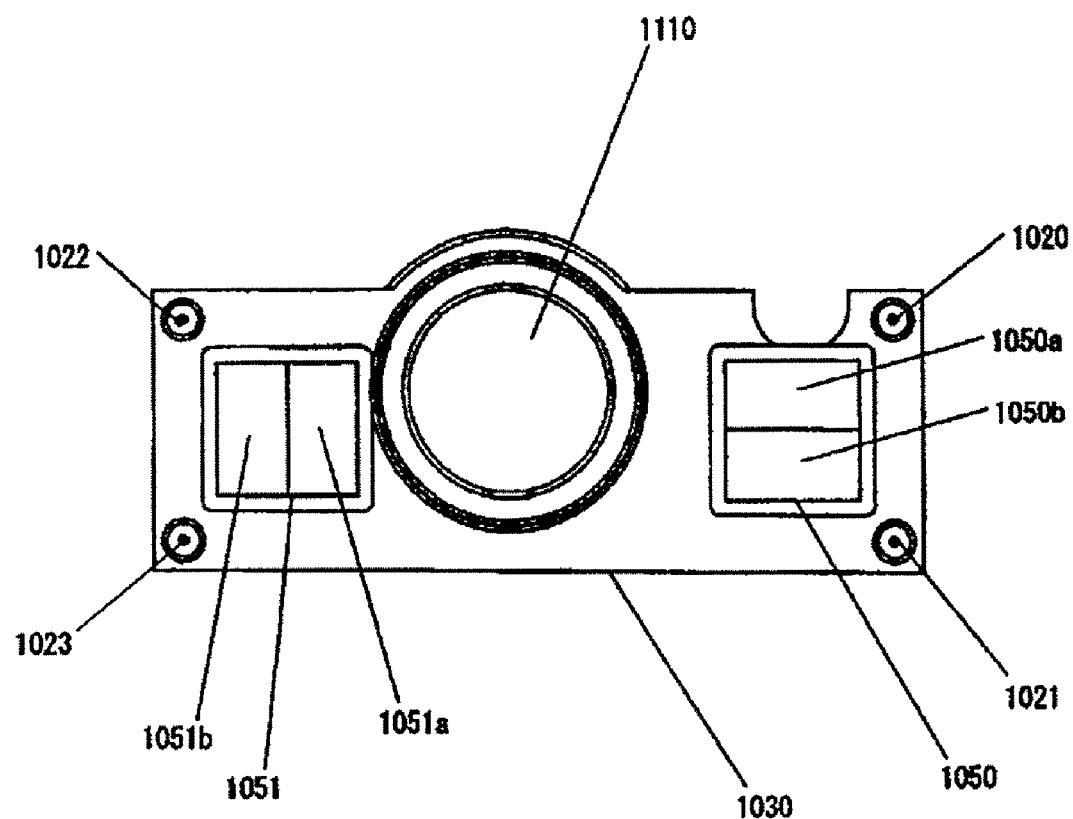
FIG. 20 is a top view showing the image stabilization apparatus in Embodiment 1 from which part thereof is omitted.

FIG. 20 is a top view showing the image stabilization apparatus in FIG. 15 from which the coils 1060 and 1061 are removed.

As described above, the magnet 1051 which drives the fourth lens unit 1110 in the first direction (X direction) and the magnet 1050 which drives it in the second direction (Y direction) can be placed in line on both sides of the fourth lens unit 1110 serving as the correction optical system to provide the image stabilization apparatus which is thin in the second direction (Y direction).

As shown in FIG. 7, in the lens barrel portion, the four wires 1020 to 1023 of the image stabilization apparatus are placed in the empty space outside the fifth lens frame 1440 driven in the optical axis direction in zooming and focusing. With this arrangement, the fourth lens unit 1110 serving as the correction optical system can be movably supported in the plane orthogonal to the optical axis without increasing the size of the lens barrel portion.

In Embodiment 1, the wires having a circular section and different diameters provide different levels of flexural rigidity, so that they produce different degrees of elastic force when they are bent by the same amount. However, the sectional shape is not limited to the circle, in other words, their section areas or shapes may be different to provide different degrees of elastic force.

Embodiment 2

Figure 21:
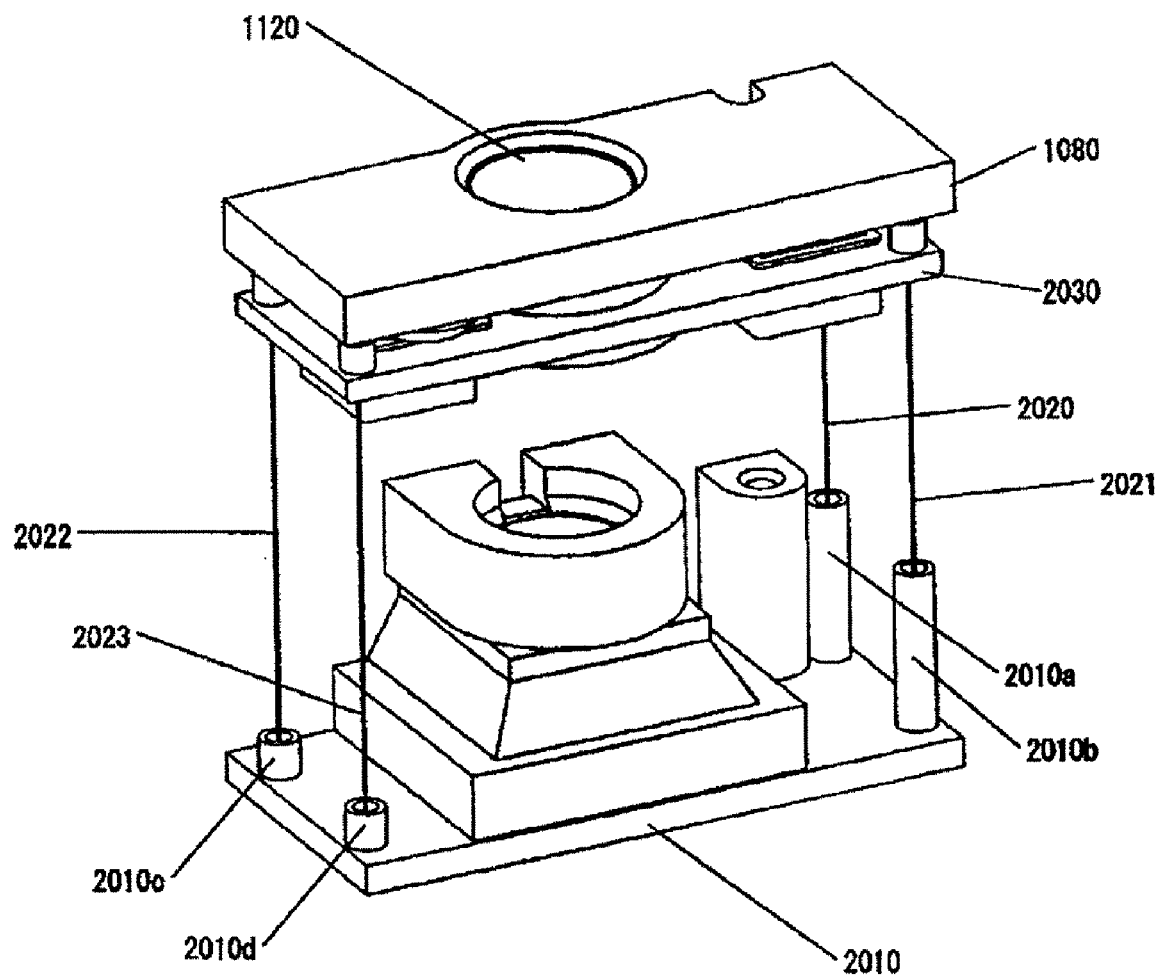
FIG. 21 is a perspective view showing an image stabilization apparatus which is Embodiment 2 of the present invention.

FIG. 21 is a perspective view showing an image stabilization apparatus in Embodiment 2.

In Embodiment 1, when the lens holding member 1030 is displaced, the wire reaction force Sa of the wire 1020 and the wire reaction force Sb of the wire 1021 are greater than the wire reaction force Sc of the wire 1022 and the wire reaction force Sd of the wire 1023. This also applies to Embodiment 2. In Embodiment 1, the wire 1020 and the wire 1021 have the larger diameter of 0.29 mm and the wire 1022 and the wire 1023 have the smaller diameter of 0.18 mm to provide those wire reaction forces.

In Embodiment 2, all of four wires 2020 to 2023 have the same diameter of 0.18 mm. However, the wires 2020 and 2021 have overall lengths shorter than those of the other two wires 2022 and 2023 to provide wire reaction forces Sa and Sb larger than reaction forces Sc and Sd. To achieve the structure, fixing portions 2010a and 2010b of a base support member 2010 are formed such that they have larger heights than fixing portions 2010c and 2010d. When a lens holding member 2030 is translated in the plane orthogonal to an optical axis, the ends of the four wires 2020 to 2030 are bent by the same amount. However, since the overall lengths of the wires 2020 and 2021 are shorter than those of the wires 2022 and 2023, the wire reaction forces Sa and Sb are larger than the wire reaction forces Sc and Sd.

In Embodiment 2, the heights of the fixing portions 2010a and 2010b are set such that the ratio of the wire reaction forces Sa and Sb and the wire reaction forces Sc and Sd is the same value as that in Embodiment 1.

Since the four wires with the same diameter can be used in this manner, the cost can be reduced.

Embodiment 3

Figure 22:
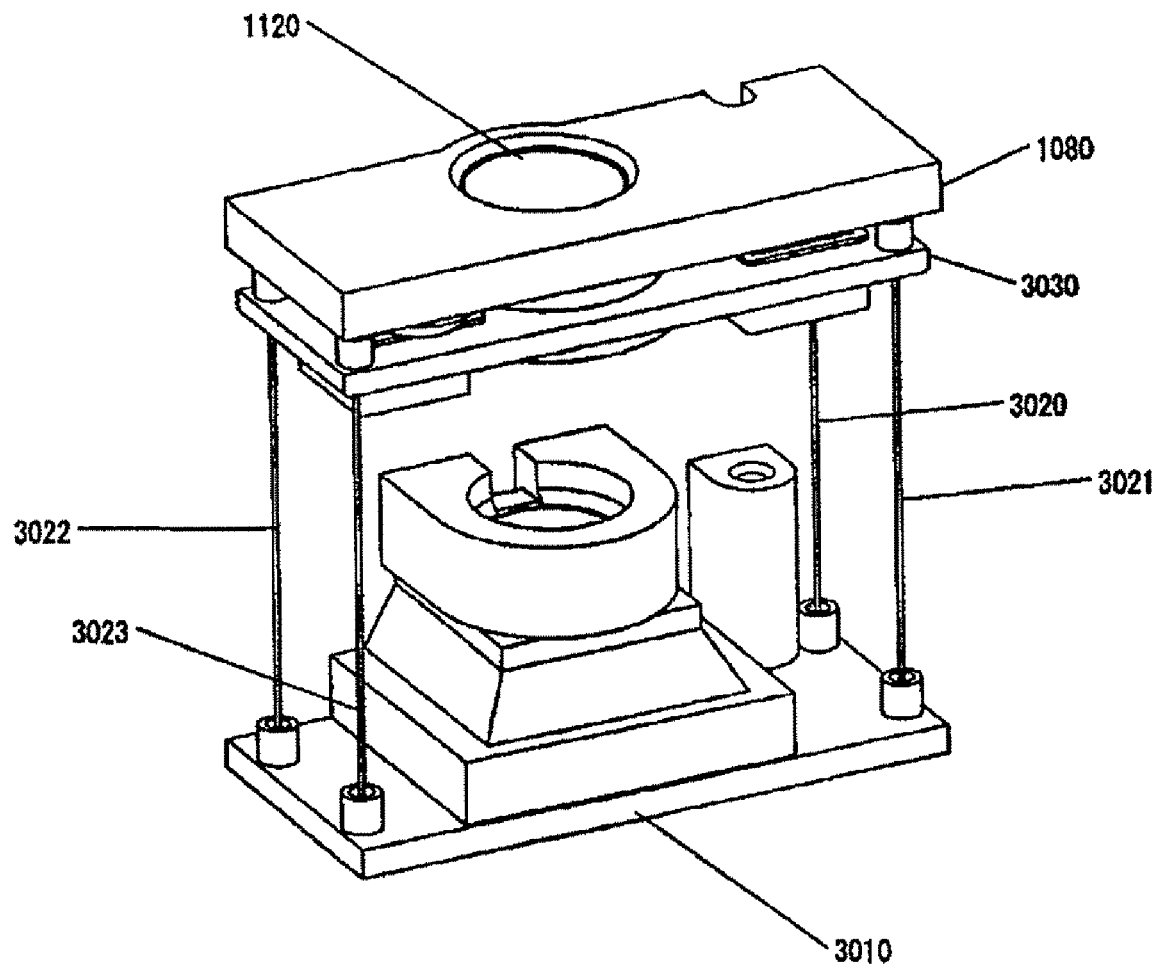
FIG. 22 is a perspective view showing an image stabilization apparatus which is Embodiment 3 of the present invention.

FIG. 22 is a perspective view showing an image stabilization apparatus in Embodiment 3.

In Embodiment 3, wire reaction forces Sa and Sb are larger than wire reaction forces Sc and Sd as in Embodiment 1. Embodiment 3 differs from Embodiment 1 in that all of four wires 3020 to 3023 have the same diameter of 0.18 mm, the wires 3020 and 3021 are made of stainless steel, and the wires 3022 and 3023 are made of phosphor bronze. Since the modulus of elasticity of the stainless steel in flexural rigidity is higher than that of the phosphor bronze, the wire reaction forces Sa and Sb can be larger than the wire reaction forces Sc an Sd when the wires 3020 to 3023 are bent by the same amount.

Since the four wires having the same diameter and the same length can be used, the fixing portions for the wires do not need large space or length (height), thereby allowing a reduced size of the apparatus.

Embodiment 4

Figure 23:
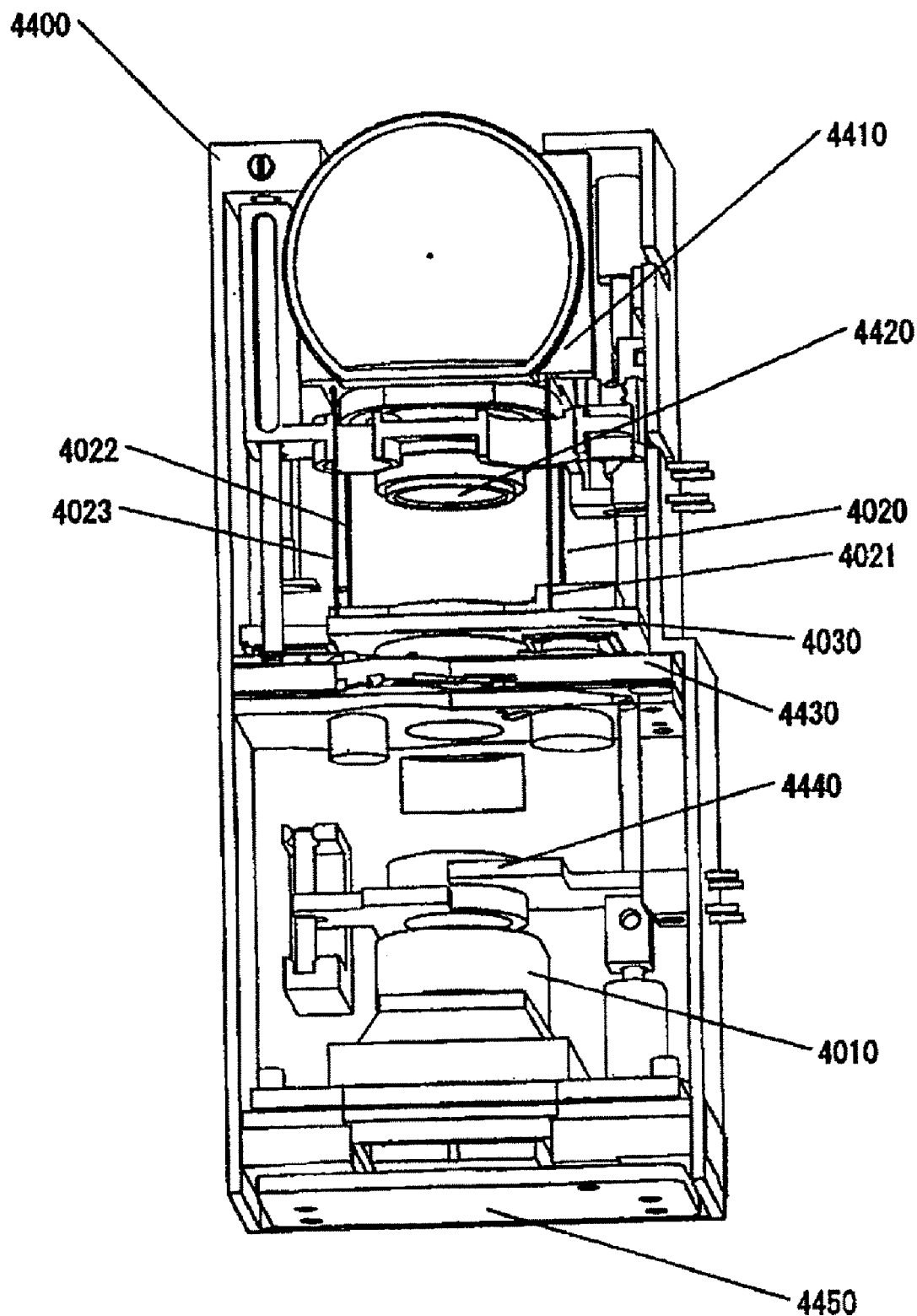
FIG. 23 is a perspective view showing an image stabilization apparatus which is Embodiment 4 of the present invention.

FIG. 23 is a perspective view showing a lens barrel portion which is Embodiment 4.

Embodiment 4 is largely different from Embodiment 1 in that wires for supporting a lens holding member 4030 holding a fourth lens unit serving as a correction optical system are placed closer to a first lens frame 4410 in an upper portion of FIG. 23. Furthermore, Embodiment 4 is different from Embodiment 1 in that the lens holding member 4030 holding the correction optical system is disposed closer to the first lens frame 4410 than a shutter unit 4430 as shown in FIG. 23. One ends of wires 4020 to 4023 are fixed to the lens holding member 4030 serving as a movable member, while the other ends of the wires 4020 to 4023 are fixed to the first lens frame 4410 serving as a fixed member. A second lens frame 4420 is moved for zooming in the direction of the optical axis between the four wires 4020 to 4023.

When the shutter unit 4430 is close to the correction optical system (fourth lens unit) in this manner, the overall length of the wires 4020 to 4023 can be increased by placing the wires 4020 to 4023 extending in the direction opposite to the shutter unit 4430 from the lens holding member 4030. If the overall length of the wires can be set arbitrarily to a large value, the spring constant of the wires can be arbitrarily set, thereby making it possible to easily arrange the image stabilization apparatus.

While the four wires are used in Embodiments 1 to 4, three wires may be used as shown in Japanese Patent Laid-Open No. H02(1990)-66536. Furthermore, five or more wires may be used. Moreover, while the flexural rigidities of two of the four wires are different from those of the other two wires in Embodiments 1 to 4, the flexural rigidity of at least one of the four wires may be different from that of the other at least one wire. For example, the flexural rigidities of three of the four wires may be different from that of the other one wire.

While Embodiments 1 to 4 have been described the cases where image stabilization is performed by moving the correction optical system, image stabilization may be performed by moving an image-pickup element (or a member for holding it) serving as a movable member in a direction orthogonal to the optical axis of the image-pickup optical system.

Furthermore, the present invention is not limited to these preferred embodiments and various variations and modifications may be made without departing from the scope of the present invention.

This application claims foreign priority benefits based on Japanese Patent Application No. 2006-017845, filed on Jan. 26, 2006, which is hereby incorporated by reference herein in its entirety as if fully set forth herein.

What is claimed is:

1. An image stabilization apparatus comprising:
a movable member which is movable relative to a fixed member of the apparatus to achieve image stabilization;
plural flexible members which movably support the movable member at least in a direction orthogonal to an optical axis of the apparatus, a portion of each of the flexible members on one end side in a direction along the optical axis being fixed to the fixed member, and a portion of each of the flexible members on the other end side being fixed to the movable member; and
an actuator which drives the movable member,
wherein flexural rigidity of at least one of the plural flexible members in the direction orthogonal to the optical axis is different from that of the other at least one flexible member in the direction orthogonal to the optical axis so as to suppress rotation of the movable member driven by the actuator, and
wherein the plural flexible members and the actuator are placed such that the resultant of elastic forces generated in the plural flexible members equals drive force generated by the actuator on a same line when the movable member is driven by the actuator.

2. The image stabilization apparatus according to claim 1, wherein the at least one of the flexible members has a cross-sectional area different from that of the other at least one flexible member.

3. The image stabilization apparatus according to claim 1, wherein the at least one of the flexible members has a length different from that of the other at least one flexible member.

4. The image stabilization apparatus according to claim 1, wherein the at least one of the flexible members is made of a material different from that of the other at least one flexible member.

5. An optical apparatus comprising:
   an image stabilization apparatus comprising:
      a movable member which is movable relative to a fixed member of the apparatus to achieve image stabilization;
      plural flexible members which movably support the movable member at least in a direction orthogonal to an optical axis of the apparatus, a portion of each of the flexible members on one end side in a direction along the optical axis being fixed to the fixed member, and a portion of each of the flexible members on the other end side being fixed to the movable member; and
   an actuator which drives the movable member,
   wherein flexural rigidity of at least one of the plural flexible members in the direction orthogonal to the optical axis is different from that of the other at least one flexible member in the direction orthogonal to the optical axis so as to suppress rotation of the movable member driven by the actuator, and
   wherein the plural flexible members and the actuator are placed such that the resultant of elastic forces generated in the plural flexible members equals drive force generated by the actuator on a same line when the movable member is driven by the actuator.

* * * * *